(12) United States Patent
Ono et al.

(10) Patent No.: US 12,132,614 B2
(45) Date of Patent: Oct. 29, 2024

(54) POLICY DETERMINATION APPARATUS, POLICY DETERMINING METHOD AND PROGRAM

(71) Applicant: NTT Communications Corporation, Tokyo (JP)

(72) Inventors: Shintaro Ono, Chigasaki (JP); Takayuki Kamei, Funabashi (JP)

(73) Assignee: NTT Communications Corporation, Tokyo (JP)

( * ) Notice: Subject to any disclaimer, the term of this patent is extended or adjusted under 35 U.S.C. 154(b) by 327 days.

(21) Appl. No.: 17/555,271

(22) Filed: Dec. 17, 2021

(65) Prior Publication Data

US 2022/0109609 A1  Apr. 7, 2022

Related U.S. Application Data

(63) Continuation of application No. PCT/JP2020/024018, filed on Jun. 18, 2020.

(30) Foreign Application Priority Data

Jun. 21, 2019 (JP) .................................. 2019-115696

(51) Int. Cl.
*H04L 41/0893* (2022.01)
*H04L 41/082* (2022.01)
(Continued)

(52) U.S. Cl.
CPC ........ *H04L 41/0893* (2013.01); *H04L 41/082* (2013.01); *H04L 45/70* (2013.01); *H04L 47/20* (2013.01)

(58) Field of Classification Search
CPC ............. H04L 41/0894; H04L 41/0893; H04L 47/125; H04L 45/70; H04L 41/0816;
(Continued)

(56) References Cited

U.S. PATENT DOCUMENTS 5,970,477 A   10/1999  Roden
6,968,389 B1  11/2005  Menditto et al.
(Continued)

FOREIGN PATENT DOCUMENTS

CN      1679359 A   10/2005
CN    101262488 A    9/2008
(Continued)

OTHER PUBLICATIONS

Cloud Native SDx Control Technology; Apr. 2018, [retrieval date Aug. 14, 2020]. https://www.ntt.co.jp/journal/1804/files/JN20180450.pdf (Japanese), https://www.ntt-review.jp/archive/ntttechnical.php?contents=ntr201807ral.pdf&mode=show_pdf (English), section "Cloud native SDx control technology", fig. 1, (Hirota, Takeshi et al., "Cloud native SDx control technology", NTT Technical Journal [online]).

(Continued)

*Primary Examiner* — Maharishi V Khirodhar
*Assistant Examiner* — Kenneth P Hunt
(74) *Attorney, Agent, or Firm* — Knobbe, Martens, Olson & Bear, LLP

(57) ABSTRACT

According to one embodiment, a policy determination apparatus includes a policy determination unit, a change condition determination unit, and a change request unit. The policy determination unit determines a first policy that the first routing control apparatus uses for controlling a routing destination of a request including first destination data. The change condition determination unit determines, based on the monitoring data, whether or not a predetermined policy change condition is satisfied. When it is determined that the policy change condition is satisfied, the change request unit requests the first policy determination apparatus to change a second policy.

17 Claims, 9 Drawing Sheets

(51) Int. Cl.
  *H04L 45/00* (2022.01)
  *H04L 47/20* (2022.01)
(58) Field of Classification Search
  CPC . H04L 47/20; H04L 43/0864; H04L 43/0817; H04L 47/10–431; H04L 47/6225; H04L 47/623; H04L 41/082
  See application file for complete search history.

(56) References Cited

U.S. PATENT DOCUMENTS

| | | | |
|---|---|---|---|
| 10,055,262 | B1 | 8/2018 | Thomas |
| 10,261,834 | B2 | 4/2019 | Mecklin et al. |
| 2003/0065762 | A1 | 4/2003 | Stolorz et al. |
| 2004/0022224 | A1 | 2/2004 | Billhartz |
| 2006/0294219 | A1 | 12/2006 | Ogawa et al. |
| 2007/0263650 | A1 | 11/2007 | Subramania et al. |
| 2008/0215718 | A1 | 9/2008 | Stolorz et al. |
| 2009/0150565 | A1 | 6/2009 | Grossner et al. |
| 2011/0264798 | A1 | 10/2011 | Joshi |
| 2011/0283016 | A1 | 11/2011 | Uchida |
| 2011/0289214 | A1 | 11/2011 | Freedman |
| 2015/0281339 | A1 | 10/2015 | Strassner |
| 2015/0312325 | A1 | 10/2015 | Lowekamp et al. |
| 2015/0365328 | A1* | 12/2015 | Luke ................ H04L 47/2483 370/235 |
| 2016/0164787 | A1* | 6/2016 | Roach ................ H04L 41/0896 370/235 |
| 2016/0337426 | A1 | 11/2016 | Shribman et al. |
| 2017/0019335 | A1* | 1/2017 | Schultz ................ H04L 45/028 |
| 2017/0126789 | A1 | 5/2017 | Kondapalli et al. |
| 2017/0230260 | A1* | 8/2017 | Gueta ................ H04L 67/02 |
| 2018/0191622 | A1 | 7/2018 | Karthikeyan et al. |
| 2018/0278498 | A1 | 9/2018 | Zeng et al. |
| 2019/0104069 | A1 | 4/2019 | Kommula et al. |
| 2020/0014486 | A1 | 1/2020 | Harrang et al. |
| 2020/0177502 | A1 | 6/2020 | Lucas et al. |
| 2020/0195673 | A1 | 6/2020 | Lee |
| 2020/0314208 | A1 | 10/2020 | Meenan et al. |
| 2022/0116316 | A1 | 4/2022 | Kisa et al. |
| 2022/0116324 | A1 | 4/2022 | Kamei |
| 2022/0116328 | A1 | 4/2022 | Tamura et al. |

FOREIGN PATENT DOCUMENTS

| | | |
|---|---|---|
| CN | 101610174 A | 12/2009 |
| EP | 1529406 B1 | 5/2012 |
| GB | 2539994 A | 1/2017 |
| JP | 2005-537687 A | 12/2005 |
| JP | 2009-181152 A | 8/2009 |
| JP | 2011-170422 | 9/2011 |
| JP | 2012-159873 | 8/2012 |
| JP | 2015-231134 | 12/2015 |
| WO | WO 2005/034446 | 4/2005 |
| WO | WO 2009/072094 A2 | 6/2009 |
| WO | WO 2017/037768 A1 | 3/2017 |
| WO | WO 2017/119950 A1 | 7/2017 |
| WO | WO 2020/256074 A1 | 12/2020 |
| WO | WO 2020/256075 A1 | 12/2020 |
| WO | WO 2020/256076 A1 | 12/2020 |
| WO | WO 2020/256077 A1 | 12/2020 |

OTHER PUBLICATIONS

Laquerre, Peter et al. Oracle Cloud Infrastructure Load Balancing Classic; Nov. 2018, [retrieval date Aug. 14, 2020], Internet: https://docs.oracle.com/cd/E83857_01/iaas/load-balancer-cloud/1brug/index.html, in particular section, section "Creating a load balancer policy", non-official translation ("Using Oracle Cloud Infrastructure Load Balancing Classic E76938-08 [online]").
PCT International Search Report and Written Opinion for International Application No. PCT/JP2020/024016 dated Aug. 25, 2020, 16 pages.
PCT International Preliminary Report on Patentability for International Application No. PCT/JP2020/024016 dated Dec. 30, 2021, 13 pages.
PCT International Search Report and Written Opinion for International Application No. PCT/JP2020/024017 dated Aug. 25, 2020, 14 pages.
PCT International Preliminary Report on Patentability for International Application No. PCT/JP2020/024017 dated Dec. 30, 2021, 11 pages.
PCT International Search Report and Written Opinion for International Application No. PCT/JP2020/024018, dated Sep. 1, 2020, 11 pages.
PCT International Preliminary Report on Patentability for International Application No. PCT/JP2020/024018, dated Dec. 30, 2021, 9 pages.
PCT International Search Report and Written Opinion for International Application No. PCT/JP2020/024015, dated Aug. 25, 2020, in 14 pages.
PCT International Preliminary Report on Patentability for International Application No. PCT/JP2020/024015, dated Dec. 30, 2021, in 11 pages.
Extended Search Report for EP Application No. 20825665.1 dated May 9, 2023, 9 pages.
Japanese Office Action for JP Application No. 2019-115693 dated Jun. 6, 2023, 7 pages.
Extended Search Report for EP Application No. 20827422.5 dated Jul. 8, 2022, 10 pages.
Extended Search Report for EP Application No. 20827498.5 dated Jul. 8, 2022, 12 pages.
Extended Search Report for EP Application No. 20826374.9 dated Jun. 21, 2022, 11 pages.
PCT International Search Report for International Application No. PCT/JP2020/024018, dated Sep. 1, 2020.
Yasukawa, Seisho et al., "Research toward Realizing a Future Network Architecture", NTT Gijutu Journal (NTT Technical Review), Mar. 2018, pp. 23-30.
U.S. Appl. No. 17/555,209, filed Dec. 17, 2021, Policy Determination Apparatus, Policy Determining Method and Program.
U.S. Appl. No. 17/555,184, filed Dec. 17, 2021, Routing Destination Evaluation Apparatus, Routing Destination Evaluating Method and Program.
U.S. Appl. No. 17/555,232, filed Dec. 17, 2021, Policy Determination Apparatus, Policy Determining Method and Program.
Chinese Office Action for CN Application No. CN 202080045536.9 dated Nov. 23, 2023, 18 pages.
Chinese Office Action for CN Application No. CN 202080045428.1 dated Jul. 25, 2024, 21 pages.

* cited by examiner

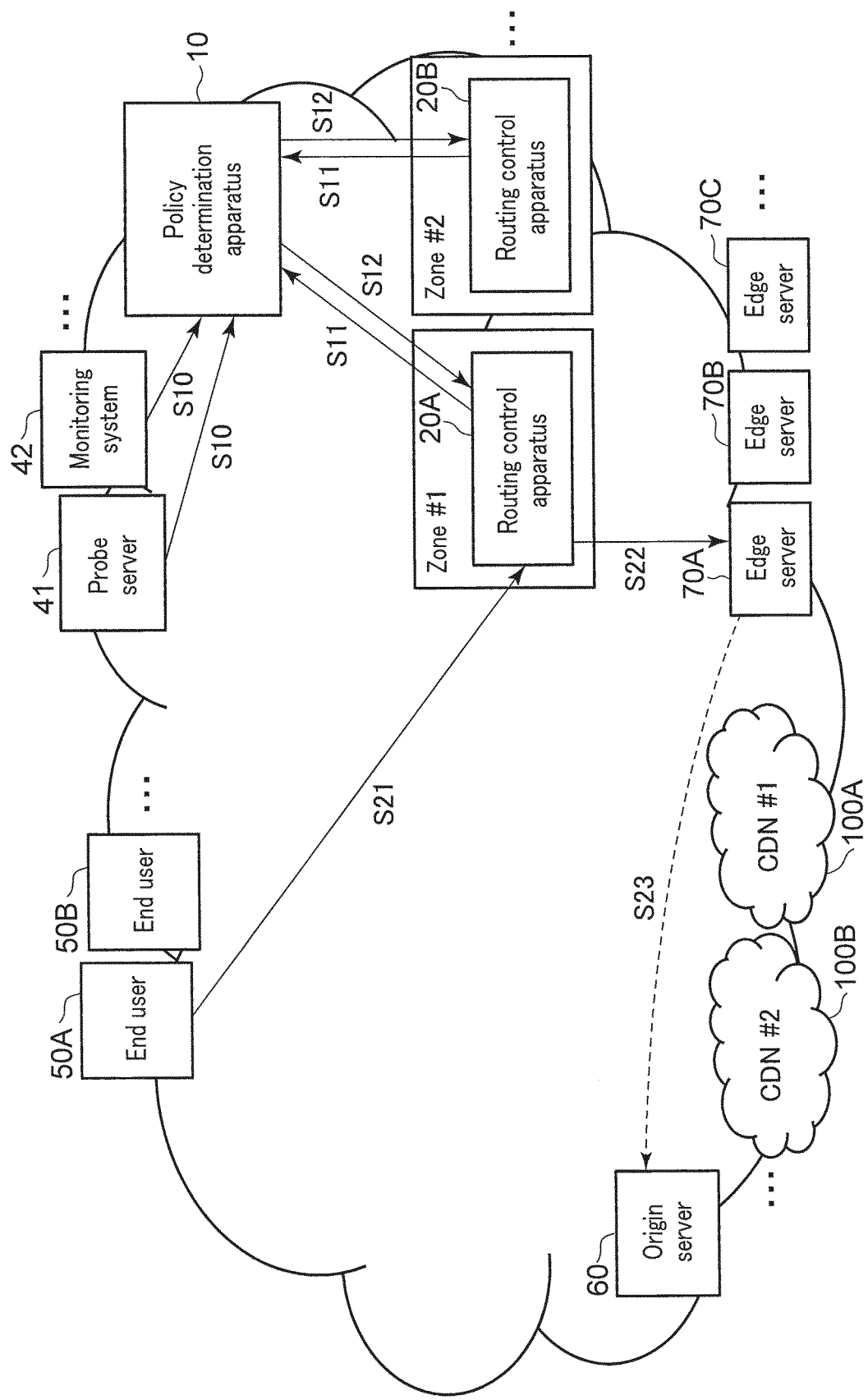
F I G. 1

|  | RTT | RTT score | Cost | Cost score |
|---|---|---|---|---|
| Edge 1 | 100 | 0--------0.8-1 | ¥500 | 0----0.4------1 |
| Edge 2 | — | 0.0-----------1 | ¥500 | 0----0.4------1 |
| Edge 3 | 200 | 0-----0.5-----1 | ¥300 | 0------0.6---1 |
| Edge 4 | — | 0.0-----------1 | ¥200 | 0--------0.7--1 |
| Edge 5 | 240 | 0----0.4------1 | ¥400 | 0-----0.5-----1 |
| Edge 6 | 160 | 0------0.6----1 | ¥500 | 0----0.4------1 |
| Edge 7 | 160 | 0------0.6----1 | ¥300 | 0------0.6---1 |
| ⋮ | ⋮ | ⋮ | ⋮ | ⋮ |

F I G. 4

|  |  | Edge score |
|---|---|---|
| Edge 1 | 80 × 0.8 + 20 × 0.4 | 72 |
| Edge 2 | 80 × 0.0 + 20 × 0.4 | 8 |
| Edge 3 | 80 × 0.5 + 20 × 0.6 | 52 |
| Edge 4 | 80 × 0.0 + 20 × 0.7 | 14 |
| Edge 5 | 80 × 0.4 + 20 × 0.5 | 42 |
| Edge 6 | 80 × 0.6 + 20 × 0.4 | 56 |
| Edge 7 | 80 × 0.6 + 20 × 0.6 | 60 |
| ⋮ | ⋮ | ⋮ |

F I G. 5

| Edge | Edge score | | Weight |
|---|---|---|---|
| Edge 1 | 72 | 72/(72+60) | 55% |
| Edge 7 | 60 | 60/(72+60) | 45% |
F I G. 6
| Edge | Edge score | | Weight |
|---|---|---|---|
| Edge 7 | 60 | 60/(60+58) | 51% |
| Edge 1 | 58 | 58/(60+58) | 49% |
F I G. 7
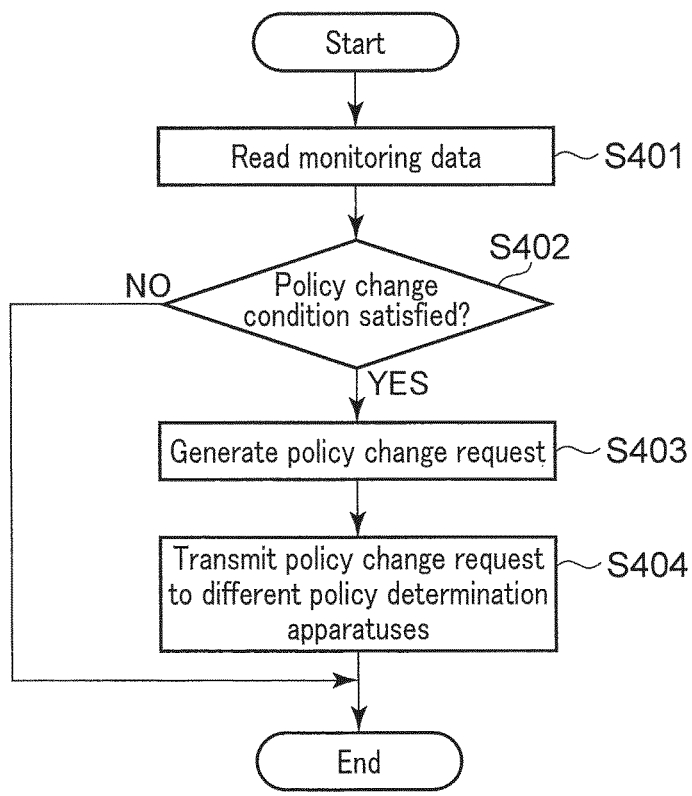
F I G. 8

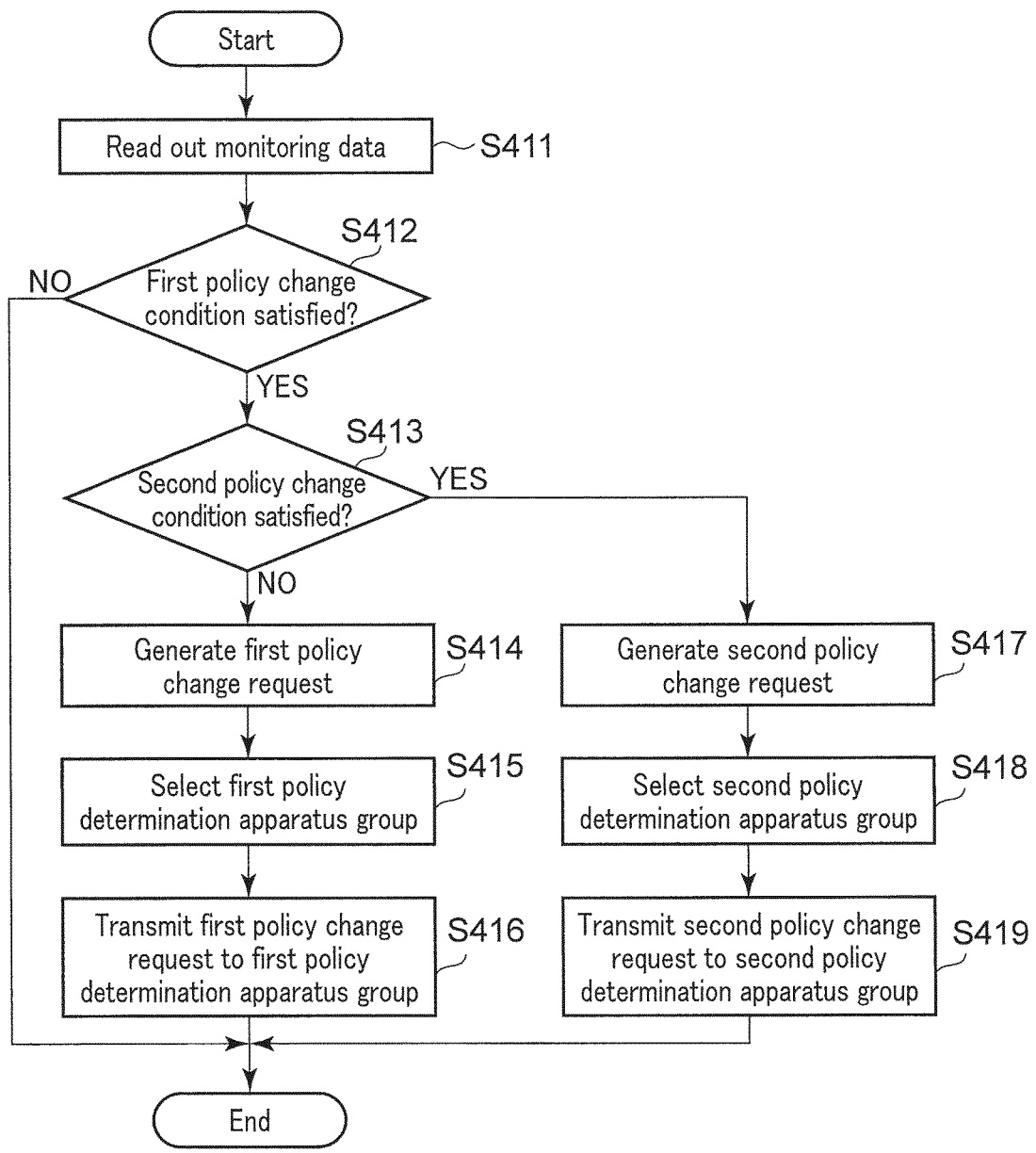
F I G. 9

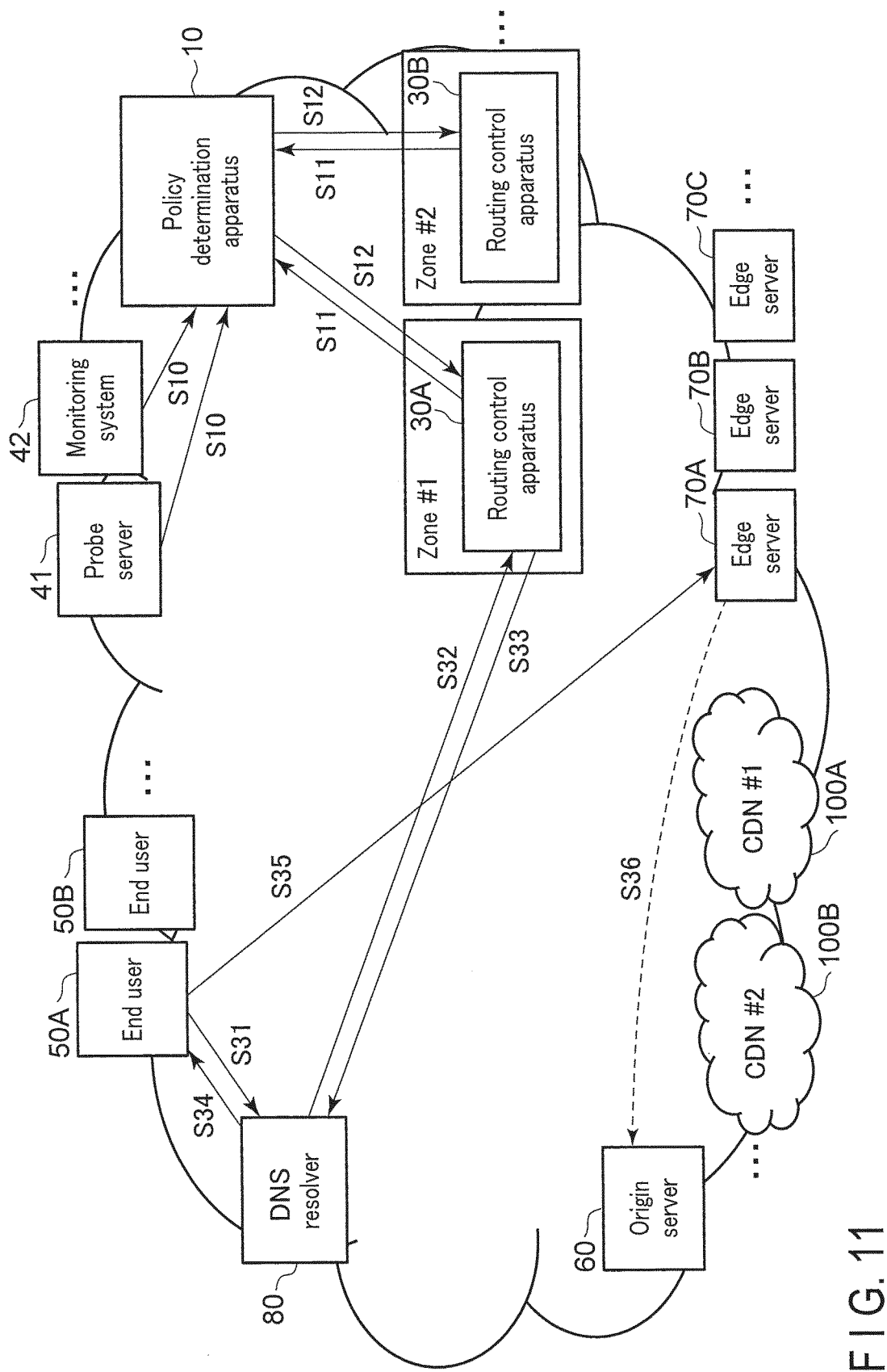
F I G. 11

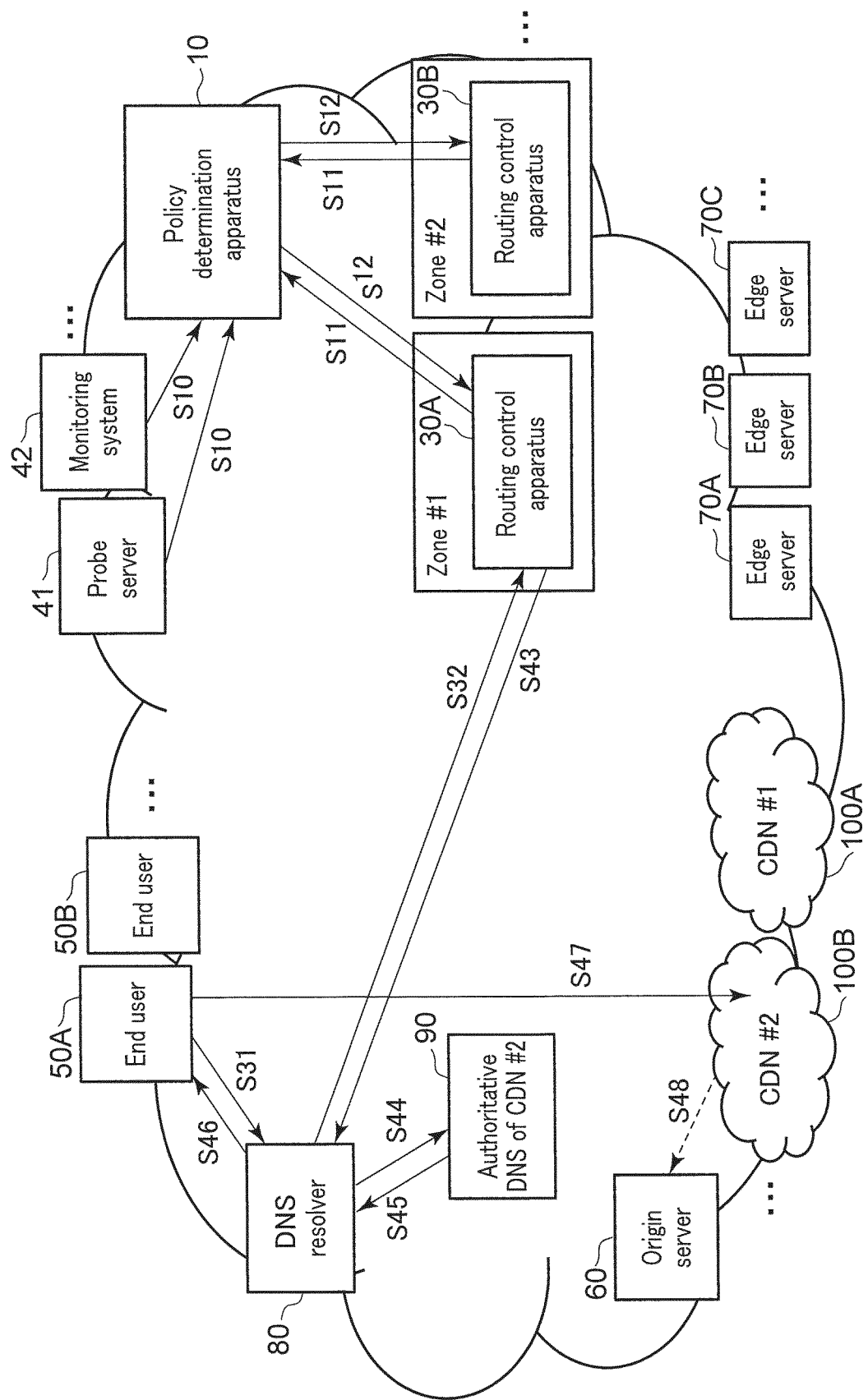
F I G. 12

POLICY DETERMINATION APPARATUS, POLICY DETERMINING METHOD AND PROGRAM

CROSS-REFERENCE TO RELATED APPLICATIONS

This application is a Continuation Application of PCT Application No. PCT/JP2020/024018, filed Jun. 18, 2020 and based upon and claiming the benefit of priority from prior Japanese Patent Application No. 2019-115696, filed Jun. 21, 2019, the entire contents of all of which are incorporated herein by reference.

FIELD

The present embodiment relates to load distribution on a network.

BACKGROUND

In a network system, the expandability and availability of the system can be enhanced by, instead of concentrating distribution of Hypertext Transfer Protocol (HTTP) requests onto a single server such as the origin server of a content delivery network (CDN), distributing the requests to this server and other substitute servers. The load distribution technique can be roughly categorized into a static division scheme and a dynamic division scheme: with the former scheme, requests are routed to different servers in accordance with a predetermined policy such as round robin and weighted round robin, whereas with the latter scheme, a request is routed to the optimal server by monitoring in real time the states of the servers, such as the number of connections, the number of clients, the volume of data communication, response time, loads on the servers, and the like.

In recent years, the load distribution technique has been applied to the edge computing technique, CDN technique, and the like. Non-patent literature 1 indicates that the CDN technique is now under consideration in order to realize high-quality distributions in an economical manner for next-generation high-definition high-presence video contents, as typified by 4K/8K and AR/VR.

CITATION LIST

Non Patent Literature

[NON PATENT LITERATURE 1] Seisho Yasukawa et al., "Research toward Realizing a Future Network Architecture", NTT Technical Review, March 2018, pages 23 to 30

SUMMARY

Technical Problem

With the aforementioned static distribution scheme, the load distribution can be realized with a simply policy, but if a change occurs in the states of routing destination candidates, the efficiency may be lowered. In contrast, with the aforementioned dynamic distribution scheme, the load distributing efficiency is not easily lowered even if there is a change in the state of the routing destination candidates. However, a load balancer is required in order to monitor the states of the routing destination candidates in real time and select a routing destination.

The purpose of the present embodiments is to dynamically determine the policy to be used for controlling the request routing.

Solution to Problem

A policy determination apparatus according to the first aspect of the present embodiment includes a monitoring data acquisition unit, a policy determination unit, a policy notification unit, a change condition determination unit, and a change request unit. The monitoring data acquisition unit is configured to acquire monitoring data relating to states of facilities on the network, which is received from an external device. The policy determination unit is configured to determine, based on the monitoring data, a first policy that a first routing control apparatus uses for controlling the routing destination of a first request including first destination data. The policy notification unit is configured to notify the first routing control apparatus of the first policy. The change condition determination unit is configured to determine based on the monitoring data whether or not a predetermined first policy change condition is satisfied. The change request unit is configured to, when it is determined that the first policy change condition is satisfied, request a first policy determination apparatus to change a second policy, the first policy determination apparatus being configured to determine a second policy that a second routing control apparatus different from the first routing control apparatus uses for controlling the routing destination of a second request including first destination data.

That is, the policy determination apparatus according to the first aspect determines whether or not the first policy change condition is satisfied, and, when it is determined that the condition is satisfied, requests the first policy determination apparatus to change the second policy determined by the first policy determination apparatus itself. Based on the received policy change request, the first policy determination apparatus corrects the second policy determined by itself. That is, the policy determination apparatus issues a policy change request upon detection of a local change in the state of the network facilities, and in response to this, the first policy determination apparatus corrects the second policy determined by the first policy determination apparatus itself. Thus, even in a large-scale load distribution system including this policy determination apparatus, the policy can be corrected in accordance with a local change in the state of the network facilities, and therefore the routing control apparatus that uses this policy can suitably route the requests.

The policy determination apparatus according to the first aspect may further include an update condition determination unit and an update request unit. The update condition determination unit determines whether or not a predetermined policy update condition is satisfied. When it is determined that the policy update condition is satisfied, the update request unit requests an update of the first policy. Such a policy determination apparatus (hereinafter referred to as the "policy determination apparatus according to the second aspect of the present embodiment") determines whether the policy update condition is satisfied, and when it is determined that the condition is satisfied, the apparatus requests an update of the first policy. Thus, this policy determination apparatus is capable of dynamically determining the first policy used by the first routing control apparatus subordinate to the policy determination apparatus.

In the policy determination apparatus according to the first or second aspect, the monitoring data may indicate the loads of at least some of the first candidates of the routing destination of a request including the first destination data. The first policy change condition may be that the load of the first routing destination included in the first candidates exceeds a first load threshold. This policy determination apparatus (hereinafter referred to as the policy determination apparatus according to the third aspect of the present embodiment") is capable of requesting the first policy determination apparatus to correct the second policy in accordance with the load of the first routing destination.

In the policy determination apparatus according to the first or second aspect, the monitoring data may indicate the number of clients for at least some of the first candidates of the routing destination of a request including the first destination data. The first policy change condition may be that the number of clients for the first routing destination included in the first candidates may exceeds the first client number threshold. Such a policy determination apparatus (hereinafter referred to as the "policy determination apparatus according to the fourth aspect of the present embodiment") is capable of requesting the first policy determination apparatus to correct the second policy in accordance with the number of clients for the first routing destination.

In the policy determination apparatus according to the first or second aspect, the monitoring data may indicate the availability of at least some of the first candidates of the routing destination of a request including the first destination data. The first policy change condition may be that the first routing destination included in the first candidates is not in the available state. This policy determination apparatus is capable of requesting the first policy determination apparatus to correct the second policy in accordance with the availability of the first routing destination.

In the policy determination apparatus according to the third or fourth aspect, the second policy may indicate proportions of a plurality of second candidates for a routing destination of the second request to which the second routing control apparatus routes the second request. When it is determined that the first policy change condition is satisfied, the change request unit may request the first policy determination apparatus to lower the proportion of the first routing destination to which the second routing control apparatus routes the second request. Such a policy determination apparatus is capable of requesting the first policy determination apparatus to lower the proportion of the first routing destination to which the second routing control apparatus routes the request, in accordance with the load of the first routing destination or the number of clients for the first routing destination.

In the policy determination apparatus according to the third aspect, the change condition determination unit further determines whether or not the predetermined second policy change condition is satisfied, based on the monitoring data. The second policy change condition may be that the load of the first routing destination exceeds the second load threshold larger than the first load threshold. When it is determined that the second policy change condition is satisfied, the change request unit requests the first policy determination apparatus to change the second policy, and also requests the second policy determination apparatus to change a third policy, where the second policy determination apparatus determines the third policy that the third routing control apparatus, which is different from the first routing control apparatus and second routing control apparatus, uses for controlling the routing destination of the a third request including the first destination data. Such a policy determination apparatus (hereinafter referred to as the "policy determination apparatus according to the fifth aspect of the present embodiment") is capable of expanding the request destinations of a policy change in steps, as the load of the first routing destination increases.

In the policy determination apparatus according to the fourth aspect, the change condition determination unit may further determine, based on the monitoring data, whether or not the predetermined second policy change condition is satisfied. The second policy change condition may be that the number of clients for the first routing destination exceeds the second client number threshold larger than the first client number threshold. When it is determined that the second policy change condition is satisfied, the change request unit requests the first policy determination apparatus to change the second policy, and also requests the second policy determination apparatus to change a third policy, where the second policy determination apparatus determines the third policy that the third routing control apparatus, which is different from the first routing control apparatus and second routing control apparatus, uses for controlling the routing destinations of the third request including the first destination data. Such a policy determination apparatus (hereinafter referred to as the policy determination apparatus according to the sixth aspect of the present embodiment) is capable of expanding the request destinations of a policy change in steps, as the number of clients for the first routing destination increases.

In the policy determination apparatus according to the fifth or sixth aspects, the second policy may indicate proportions of a plurality of second candidates for the routing destination of the second request to which the second routing control apparatus routes the second request. The third policy may indicate the proportions of a plurality of third candidates for a routing destination of third request to which the third routing control apparatus routes the third request. When it is determined that the second policy change condition is satisfied, the change request unit requests the first policy determination apparatus to lower the proportion of the first routing destination to which the second routing control apparatus routes the second request, and requests the second policy determination apparatus to lower the proportion of the first routing destination to which the third routing control apparatus routes the third request. Such a policy determination apparatus is capable of expanding the request destinations of the policy change in steps, as the load of the first routing destination or the number of clients for the first routing destination increases, and requesting the request destinations to lower the proportions of the first routing destination to which their subordinate routing control apparatuses route the requests.

In the policy determination apparatus according to the first to sixth aspects of the present embodiment, the policy determination unit may further determine the fourth policy that the first routing control apparatus uses for controlling the routing destination of requests including the first request that satisfy the first condition, based on the monitoring data. The policy notification unit may further notify the first routing control apparatus and first policy determination apparatus of the fourth policy. According to this policy determination apparatus, even if an end user that sends a request that satisfies the first condition has moved and a routing control apparatus that handles this request from the end user is thereby switched to another apparatus, the same policy can be applied to the request from this end user.

The policy determination method according to the seventh aspect of the present embodiment includes: acquiring monitoring data relating to states of facilities on a network, the monitoring data being received from an external device; determining, based on the monitoring data, a first policy that a first routing control apparatus uses for controlling a routing destination of a first request including first destination data; notifying the first routing control apparatus of the first policy; determining, based on the monitoring data, whether or not a predetermined first policy change condition is satisfied; and when it is determined that the first policy change condition is satisfied, requesting a first policy determination apparatus to change a second policy, the first policy determination apparatus being configured to determine a second policy that a second routing control apparatus different from the first routing control apparatus uses for controlling the routing destination of a second request including first destination data.

With the policy determination method according to the seventh aspect, whether the first policy change condition is satisfied is determined, and when it is determined that the condition is satisfied, a request is issued to the first policy determination apparatus to change the second policy determined by the first policy determination apparatus itself. Based on the received policy change request, the first policy determination apparatus corrects the second policy determined by itself. That is, according to this policy determination method, a policy change request can be issued upon detection of a local change in the state of the network facilities, and in response to this, the first policy determination apparatus corrects the second policy determined by the first policy determination apparatus itself. Thus, even in a large-scale load distribution system adopting this policy determination method, the policy can be corrected in accordance with a local change in the state of the network facilities, and therefore the routing control apparatus that uses this policy can suitably route the requests.

The program according to the eighth aspect of the present embodiment causes a computer to function as: means for acquiring monitoring data relating to states of facilities on the network, the monitoring data being received from an external device; means for determining, based on the monitoring data, a first policy that a first routing control apparatus uses for controlling a routing destination of a first request including first destination data; means for notifying the first routing control apparatus of the first policy; means for determining, based on the monitoring data, whether or not a predetermined first policy change condition is satisfied; and means for, when it is determined that the first policy change condition is satisfied, requesting a first policy determination apparatus to change a second policy, the first policy determination apparatus being configured to determine a second policy that a second routing control apparatus different from the first routing control apparatus uses for controlling the routing destination of a second request including first destination data.

With the program according to the eighth aspect, whether the first policy change condition is satisfied is determined, and when it is determined that the condition is satisfied, a request is issued to the first policy determination apparatus to change the second policy determined by the first policy determination apparatus itself. Based on the received policy change request, the first policy determination apparatus corrects the second policy determined by itself. That is, according to this program, a policy change request can be issued upon detection of a local change in the state of the network facilities, and in response to this, the first policy determination apparatus corrects the second policy determined by the first policy determination apparatus itself. Thus, even in a large-scale load distribution system adopting this program, the policy can be corrected in accordance with a local change in the state of the network facilities, and therefore the routing control apparatus that uses this policy can suitably route the requests.

Advantageous Effects of Invention

According to the present embodiment, the policy to be used for controlling the request routing can be dynamically determined.

BRIEF DESCRIPTION OF THE DRAWINGS

FIG. 1 is a diagram showing an exemplary load distribution system including a policy determination apparatus according to the present embodiment.

FIG. 4 is a diagram showing metrics and their scores stored in the monitoring data storage unit illustrated in FIG. 3.

FIG. 5 is a diagram explaining the operation of the policy determination unit illustrated in FIG. 3.

FIG. 6 is a diagram showing an exemplary policy stored in the policy storage unit illustrated in FIG. 3.

FIG. 7 is a diagram showing an exemplary new policy obtained by the policy determination unit of FIG. 3 correcting the policy of FIG. 6 upon a policy change request received from another policy determination apparatus.

FIG. 8 is a flowchart of an exemplary policy change request operation performed by the policy determination apparatus of FIG. 3 upon another policy determination apparatus.

FIG. 9 is a flowchart of another exemplary policy change request operation performed by the policy determination apparatus of FIG. 3 upon another policy determination apparatus.

FIG. 11 is a diagram showing a modification example of the load distribution system of FIG. 1.

FIG. 12 is a diagram showing another modification example of the load distribution system of FIG. 1.

DETAILED DESCRIPTION

Figure 2:
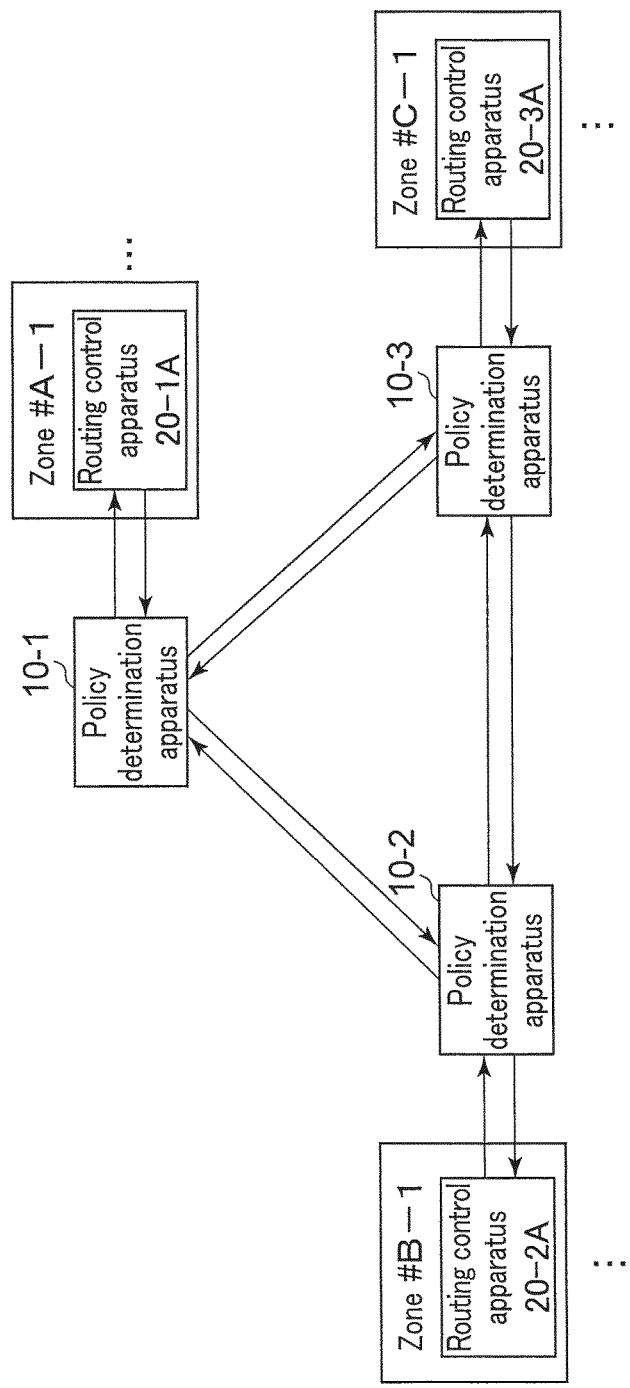
FIG. 2 is a diagram explaining cooperation of a plurality of policy determination apparatuses in the load distribution system of FIG. 1.

The embodiments will be explained with reference to the drawings. Components that are the same as or similar to already explained components are provided with the same or similar reference signs, and overlapping explanations will be basically omitted. For the same or similar components, a common reference sign may be used without distinguishing the components from each other, or sub-numbers may be added to the common reference sign to distinguish the components from each other.

Embodiments

FIG. 1 shows an exemplary load distribution system including a policy determination apparatus 10 according to the present embodiment. This load distribution system includes policy determination apparatuses 10, routing control apparatuses 20A, 20B . . . , probe servers 41, monitoring systems 42, end users 50A, 50B . . . , an origin server 60, edge servers 70A, 70B, 70C . . . , and CDNs 100A, 100B . . . .

The policy determination apparatus 10 will be described later in detail by referring to FIG. 3, and only a brief outline will be provided here. The policy determination apparatus 10 collects monitoring data from the probe server 41 and/or monitoring system 42 (S10). For instance, a policy update request (S11) from any one of the routing control apparatuses 20A, 20B . . . subordinate to the policy determination apparatus 10 triggers the policy determination apparatus 10 to determine (update) a policy that is to be used by the routing control apparatus 20, which is the request source of the policy update request. Here, the routing control apparatus 20 that uses the policy determined by the policy determination apparatus 10 will be referred to as a routing control apparatus 20 subordinate to this policy determination apparatus 10. The policy determination apparatus 10 notifies the routing control apparatus 20, which is the request source of the policy update request, of the determined policy (S12).

The policy may indicate a plurality of request routing destination candidates and proportions of the candidates to which the requests are routed. The routing control apparatus 20 may use these proportions as weights for the weighted round robin when sorting the requests.

FIG. 1 shows only one policy determination apparatus 10; however, the load distribution system of FIG. 1 may contain a plurality of policy determination apparatuses 10. There may be two routing control apparatuses 20 or only one apparatus subordinate to a policy determination apparatus 10, or there may be three or more routing control apparatuses 20 in total.

A routing control apparatus 20 may correspond to an L7 load balancer (also referred to as an HTTP load balance). A zone is defined for each routing control apparatus 20 so that the routing control apparatus 20 can route a request to the Point of Presence (PoP) of the corresponding zone. The PoP denotes the location of a routing destination having an access point to an external network.

The routing control apparatus 20 receives from the end user 50A a request including destination data of the origin server 60 (S21), and routes the request, or in other words transfers the request, to any one of the routing destinations including the origin server 60, edge servers 70A, 70B, 70C . . . , and CDNs 100A, 100B . . . in accordance with the policy determined by the policy determination apparatus 10 (S22). The request routing destinations (except for the origin server 60) may be connected to the origin server 60 as needed if the targeted content of a request is not cached or the like (S23).

The probe server 41 and/or monitoring system 42 continuously monitors the states of network facilities such as the origin server 60, edge servers 70, and/or CDNs 100 in FIG. 1, and generates monitoring data. The probe server 41 and/or monitoring system 42 transmit the monitoring data to the policy determination apparatus 10 (S10).

The end users 50 may correspond to various devices including smartphones, tablets, PCs, vehicles (including vehicle-mounted apparatuses), and sensors. In order to acquire contents (a web page or the like) held in the origin server 60, an end user 50 may issue a request containing, as destination data, a uniform resource locator (URL) indicating the location of the content. For the issued request, the end user 50 is connected to the routing control apparatus 20, using a name resolution adopting a domain name system (DNS) or using anycast. Thereafter, the end user 50 transmits this request to the routing control apparatus 20 (S21).

The origin server 60 holds original contents. The original contents held in the origin server 60 may be cached by the edge servers 70A, 70B, 70C . . . , and/or cache servers in the CDNs 100A and 100B.

The edge servers 70A, 70B, 70C . . . , and/or CDNs 100A and 100B are request routing destination candidates. The edge servers 70A, 70B, 70C . . . , and/or CDNs 100A and 100B may cache the original contents held by the origin server 60.

The policy determination apparatus 10 according to the present embodiment detects a local change in the states of the network facilities, for example in the origin server 60, edge servers 70, and/or CDNs 100 in FIG. 1, and requests a different policy determination apparatus 10 to change the policy determined by this policy determination apparatus. In response, the policy determination apparatus 10, which has received a policy change request, corrects the policy determined by the apparatus itself.

For instance, the load distribution system may include three policy determination apparatuses 10-1, 10-2, and 10-3, as illustrated in FIG. 2. The policy determination apparatus 10-1 determines a policy to be used by at least one routing control apparatus 20-1A. Similarly, the policy determination apparatus 10-2 determines a policy to be used by at least one routing control apparatus 20-2A, and the policy determination apparatus 10-3 determines a policy to be used by at least one routing control apparatus 20-3A. For instance, upon detecting a certain edge server 70 having a load that has exceeded a load threshold, the policy determination apparatus 10-1 may request the policy determination apparatus 10-2 and/or policy determination apparatus 10-3 to refrain from routing requests to this edge server 70. Upon receipt of such a request, the policy determination apparatus 10-2 and/or policy determination apparatus 10-3 may lower the proportion of this edge server 70 to which requests are routed in the self-determined policy. As a result, the proportion of this edge server 70 to which requests are routed by the routing control apparatus 20-2A and subsequent apparatuses, and/or the routing control apparatus 20-3A and subsequent apparatuses, using this policy, will decrease, while the proportions of routing destinations other that this edge server 70 will increase. Even in a large-scale load distribution system including a plurality of policy determination apparatuses 10, each policy determination apparatus 10 is allowed to correct the policy in accordance with a local change in the state of the network facilities, and therefore the routing control apparatuses 20 using this policy can suitably route the request.

Figure 3:
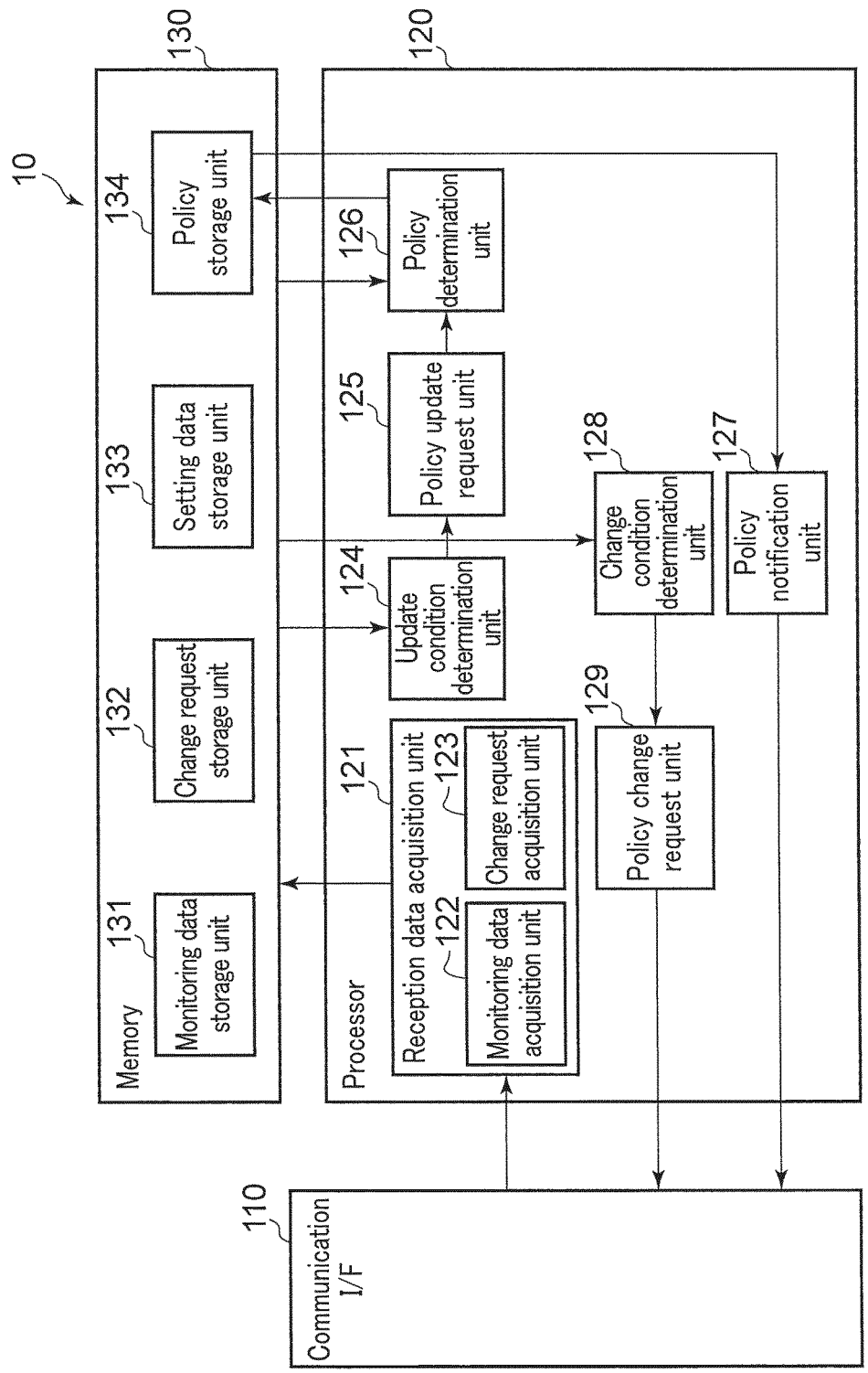
FIG. 3 is a block diagram showing an exemplary policy determination apparatus according to the present embodiment.

As illustrated in FIG. 3, the policy determination apparatus 10 according to the present embodiment includes a communication interface (I/F) 110, a processor 120, and a memory 130.

The communication I/F 110 may be a module for establishing communications via a network with external devices such as routing control apparatuses 20, probe servers 41, monitoring systems 42, and other policy determination apparatuses 10, an example of which may be an optical communication module.

The processor 120 is typically a central processing unit (CPU) and/or a graphics processing unit (GPU). The processor 120 may also be a microcomputer, a field programmable gate array (FPGA), a digital signal processor (DSP), or any other general-purpose or special-purpose processor.

The processor 120 may perform processing relating to input/output control, communication control, policy determination, and the like.

The memory 130 temporarily stores programs to be executed by the processor 120, with which the processor 120 can implement the processing, and data to be used by the processor 120, such as monitoring data, policy change requests, setting data, and policies. The memory may include a random access memory (RAM) having a work area in which the program or data is expanded.

By executing the program stored in the memory 130, the processor 120 may realize the functions of a reception data acquisition unit 121 (including a monitoring data acquisition unit 122 and a change request acquisition unit 123), an update condition determination unit 124, a policy update request unit 125, a policy determination unit 126, a policy notification unit 127, a change condition determination unit 128, and a policy change request unit 129 illustrated in FIG. 3. The memory 130 may include a monitoring data storage unit 131, a change request storage unit 132, a setting data storage unit 133, and a policy storage unit 134 illustrated in FIG. 3.

The communication I/F 110 is configured to receive various kinds of data from external devices and transmit it to the reception data acquisition unit 121, or to transmit various kinds of data to external devices.

For instance, the communication I/F 110 receives monitoring data relating to the states of the facilities of a network from the probe server 41 or monitoring system 42 via the network, and transmits this to the reception data acquisition unit 121. Here, the monitoring data may include metrics indicating the states of candidates, such as edge servers 70 and/or CDNs 100, which can be selected by the routing control apparatuses 20 subordinate to the policy determination apparatus 10 as routing destinations of requests including destination data of the origin server 60 from an end user 50. The states of the routing destination candidates here may include, or may not include, some or all of the loads of the candidates, response time (e.g., round-trip time (RTT)), costs (communication charges), availability, the number of connections, the number of clients, volume of data communications, and the like.

The communication I/F 110 also receives a policy change request from other policy determination apparatuses 10 via a network, and transmits the request to the reception data acquisition unit 121. A policy change request may be a request for lowering or increasing the proportion of specific ones of the request routing destination candidates to which the routing control apparatus 20 subordinate to a policy determination apparatus 10 routes the requests. Alternatively, a policy change request may be a request for lowering or increasing the priorities assigned to a specific portion of the metrics, which will be described later, in order for the policy determination apparatus 10 to determine a policy. A policy change request may include metrics, or its processed values or statistical values, collected by other policy determination apparatuses 10, and may be a request issued to the policy determination apparatus 10 to change the policy based on these metrics or the like.

Furthermore, the communication I/F 110 receives from the policy notification unit 127 the policy and the data (e.g., an address) that identifies the policy-notification-destination routing control apparatus 20 subordinate to the policy determination apparatus 10, and transmits the policy to this routing control apparatus 20 via a network. This policy is used by the notification-destination routing control apparatus 20 to control the destinations for routing the requests including the destination data of the origin server 60 from the end users 50.

The communication I/F 110 also receives from the policy change request unit 129 a policy change request and data (such as an address) that identifies the request destination policy determination apparatus 10, and transmits the policy change request to this policy determination apparatus 10 via a network.

The reception data acquisition unit 121 acquires various kinds of data received by the communication I/F 110 and writes this data into the memory 130. The reception data acquisition unit 121 may include a monitoring data acquisition unit 122 and a change request acquisition unit 123.

The monitoring data acquisition unit 122 acquires the monitoring data received by the communication I/F 110, and writes this data into the monitoring data storage unit 131 of the memory 130.

The monitoring data storage unit 131 stores monitoring data, metrics in particular, acquired by the monitoring data acquisition unit 122. The monitoring data stored in the monitoring data storage unit 131 may be read out by the various functional units of the processor 120, such as the update condition determination unit 124, the policy determination unit 126, and/or change condition determination unit 128.

As mentioned above, the metrics indicate the state of a candidate selectable as a request routing destination.

The metrics may be a value as-is contained in the monitoring data, or a manipulated value or statistical value of the contained value.

Each metrics value may be normalized as a score between 0 and 1. The functional unit that conducts this process may be referred to as a metrics normalization unit (not shown). The monitoring data storage unit 131 may store the routing destination candidates in association with the metrics of the candidates and/or their scores. FIG. 4 shows an example of RTT and cost metrics, as well as their scores, for each routing destination candidate (edge).

The change request acquisition unit 123 acquires the policy change request received by the communication I/F 110 and stores it in the change request storage unit 132 of the memory 130.

The change request storage unit 132 stores the policy change request acquired by the change request acquisition unit 123. The policy change request stored in the change request storage unit 132 is read out by the various functional units of the processor 120, for instance by the update condition determination unit 124 and/or policy determination unit 126.

The setting data storage unit 133 stores various types of setting data. The setting data here may include parameters relating to the policy determination, data of the routing control apparatuses 20 subordinate to the policy determination apparatus 10, data relating to the routing destination candidates selectable for the routing control apparatus 20, and the like. The parameters relating to the policy determination may include priorities (weights) assigned to respective items of the metrics, parameters designating the number of routing destination candidates that can be included in the policy, various threshold values, and the like, which are used for scoring the routing destination candidates with a weighted sum of the metrics.

The update condition determination unit 124 determines whether or not a predetermined policy update condition is satisfied. When it is determined that the policy update condition is satisfied, the update condition determination unit 124 notifies the policy update request unit 125 that the policy update condition is satisfied. If there are a plurality of routing control apparatuses 20 subordinate to the policy determination apparatus 10, the update condition determination unit 124 may determine, for every routing control apparatus 20, whether or not the policy update condition of the policy used by this routing control apparatus 20 is satisfied.

For instance, the policy update condition may be that the metrics and/or their scores stored in the monitoring data storage unit 131 either have been changed or have changed beyond a threshold value. Alternatively, the policy update condition may be that a length of time that exceeds a threshold value has elapsed after the previous policy update (or determination). The policy update condition may be that a new policy change request is stored in the change request storage unit 132. The policy update condition may be that a policy update request is received from a routing control apparatus 20 subordinate to the policy determination apparatus 10 and is stored in the memory 130.

Upon the notification of the policy update condition being satisfied from the update condition determination unit 124, the policy update request unit 125 sends a request for a policy update to the policy determination unit 126.

The policy determination unit 126 determines the policy based on the various types of data stored in the memory 130 and writes it into the policy storage unit 134 at the time of, for example, initial setting of the policy determination apparatus 10, setting of an additional routing control apparatus 20 subordinate to the policy determination apparatus 10, or a request for a policy update received from the policy update request unit 125. To determine the policy, the policy determination unit 126 may refer to the monitoring data (which may include metrics) stored in the monitoring data storage unit 131, the policy change requests stored in the change request storage unit 132, the setting data stored in the setting data storage unit 133, and/or the policies stored in the policy storage unit 134.

For instance, the policy determination unit 126 may determine the scores of the candidates by obtaining a weighted addition of multiple types of (the scores of) metrics of the routing destination candidates in accordance with the priorities assigned to each item of the metrics. An example of scoring is shown in FIG. 5. "Edge 1", "Edge 2" . . . , and "Edge 7" in FIG. 5 correspond to the routing destination candidates, and the priorities assigned to the "RTT score" and "cost score" are "0.8" and "0.2", respectively. The priorities may be set in accordance with the preferences of the administrator of the policy determination apparatus 10, routing control apparatus 20, and/or the administrator of the origin server 60. In the example of FIG. 5, greater importance is placed on "RTT" than "costs". However, greater importance may be placed on "costs" instead, or on (the scores of) metrics other than "costs" and "RTT".

The policy determination unit 126 may narrow down the routing destination candidates to be included in the policy, based on the scores of the routing destination candidates and/or the availability or other metrics of the candidates. For instance, the policy determination unit 126 may eliminate candidates having scores ranked in a place below the predetermined ordinal place, or candidates having scores lower than a predetermined threshold value. Candidates that are not in the available state may be eliminated.

The policy determination unit 126 further determines, based on the scores of the routing destination candidates, weights indicating the proportions of candidates to which the routing control apparatus 20 that will use the to-be-determined policy routes the requests. As indicated in FIG. 6, for instance, the policy determination unit 126 may determine, as the weight of each candidate, the proportion of the score of a candidate to the total score of all the routing destination candidates to be included in the policy. This is an exemplary method for determining weights. The weights may be predetermined in accordance with the order of scores. The weights may be used as weights for the weighted round robin scheme in the load distribution technique. That is, the routing control apparatus 20 that uses the policy of FIG. 6 routes 55% of the requests to Edge 1, and the remaining 45% to Edge 7.

When a policy change request is stored in the change request storage unit 132, the policy determination unit 126 may correct the policy in accordance with the policy change request. If the policy change request is to request the policy determination apparatus 10 to lower the edge score of Edge 1 20% (≈14), the policy determination unit 126 may read the policy of, for example, FIG. 6 from the policy storage unit 134, lower the edge score of Edge 1 from "72" to "58", and recalculate the weights, thereby changing the policy to the one indicated in FIG. 7. As a result, the routing control apparatus 20 routes 51% of the requests to Edge 7, and the remaining 49% to Edge 1. Thus, in comparison to the policy before the change, the load on Edge 1 can be suppressed.

The policy storage unit 134 stores the policy determined by the policy determination unit 126. The policy stored in the policy storage unit 134 may be read out by a functional unit, for example the policy notification unit 127, of the processor 120.

When a new policy (including an updated policy) is stored in the policy storage unit 134, the policy notification unit 127 reads this policy out, and reports it to the corresponding routing control apparatus 20. In particular, the policy notification unit 127 transmits to the communication I/F 110 the policy and the data that identifies the routing control apparatus 20 to which the policy is reported, and the communication I/F 110 transmits the policy to this routing control apparatus 20 via a network.

The change condition determination unit 128 determines whether or not the predetermined policy change condition is satisfied, based on various kinds of data stored in the memory 130, such as monitoring data (which may include metrics data). When it is determined that the policy change condition is satisfied, the change condition determination unit 128 notifies the policy change request unit 129 that the policy change condition is satisfied. The change condition determination unit 128 may determine satisfaction of multiple policy change conditions. When it is determined that any of the policy change conditions is satisfied, the change condition determination unit 128 may notify the policy change request unit 129 of which of the policy change conditions is satisfied.

In particular, the policy change conditions may be that the load of a certain candidate of the routing destinations exceeds the load threshold, that the number of clients of the candidate exceeds the client number threshold, or that the candidate is not in an available state. Multiple policy change conditions may be defined from the same aspect in different steps. For instance, with respect to a load, the first policy change condition may be defined as the load of a routing destination candidate exceeding a first load threshold, and the second policy change condition may be defined as this load exceeding a second load threshold (>first load threshold). Similarly, with respect to the number of clients, the first policy change condition may be defined as the number of clients of a certain routing destination candidate exceeding a first client number threshold, and the second policy change condition may be defined as the number of clients exceeding a second client number threshold (>first client number threshold).

Upon the notification from the change condition determination unit 128 of the policy change condition change being satisfied, the policy change request unit 129 requests another policy determination apparatus 10 to change the determined policy. In particular, the policy change request unit 129 generates a policy change request that indicates description of the change to be requested to the other policy determination apparatus 10, for example, a decrease in weights of some of the routing destination candidates in the policy determined by the policy determination apparatus 10. The policy change request unit 129 transmits to the communication I/F 110 the generated policy change request and the data that identifies the request destination policy determination apparatuses 10, in response to which the communication I/F 110 transmits the policy change request to these policy determination apparatuses 10 via a network.

The policy change request unit 129 may select request destination policy determination apparatuses 10 in accordance with the policy change condition that is satisfied. For instance, the policy change request unit 129 may differentiate the policy determination apparatuses 10 to be included as the request destinations between Case 1-1 where the load of a routing destination candidate is larger than the first load threshold and is smaller than the second load threshold (>first load threshold), and Case 1-2 where the load is larger than the second load threshold.

In particular, the load of the routing destination candidate in Case 1-2 demonstrates a higher degree of seriousness than in Case 1-1. In order to suitably control the load of the candidate, a request for lowering the weight of this candidate may need to be issued to a larger number of policy determination apparatuses 10. In contrast, in Case 1-1 where the degree of seriousness regarding the load of the routing destination candidate is not as high as in Case 1-2, suitable control of the load of the candidate may be achieved only by requesting a relatively small number of policy determination apparatuses 10 to lower the weight of the candidate.

Similarly, the policy change request unit 129 may differentiate the policy determination apparatuses 10 to be included as request destinations between Case 2-1 where the number of clients of a routing destination candidate is larger than the first client number threshold and is smaller than the second client number threshold (>first client number threshold), and in Case 2-2 where the number of clients is larger than the second client number threshold.

In particular, the number of clients of the routing destination candidate demonstrates a higher degree of seriousness in Case 2-2 than in Case 2-1. In order to suitably control the load of the candidate, a request for lowering the weight of this candidate may need to be issued to a larger number of policy determination apparatuses 10. In contrast, in Case 2-1 where the degree of seriousness of the number of clients of the routing destination candidate is not as high as in Case 2-2, suitable control of the load of the candidate may be achieved only by requesting a relatively small number of policy determination apparatuses 10 to lower the weight of the candidate.

Furthermore, the policy change request unit 129 may select the description of the change to be requested to other policy determination apparatuses 10 in accordance with the policy change condition that is satisfied. For instance, in the above Cases 1-2 and 2-2, the request to the policy determination apparatuses 10 may be that the weight of the routing destination candidate be lowered to a greater extent than in Cases 1-1 and 2-1.

An exemplary policy change request operation executed by the policy determination apparatus 10 upon other policy determination apparatuses 10 will be explained below with reference to FIG. 8. The operation of FIG. 8 may be executed on a regular basis or irregular basis. For instance, the operation of FIG. 8 may be executed every time new monitoring data or a policy update request from a routing control apparatus 20 subordinate to the policy determination apparatus 10 or the like is stored in the memory 130.

First, the change condition determination unit 128 reads monitoring data from the monitoring data storage unit 131 (step S401). At step S401, the change condition determination unit 128 may read other data from the memory 130.

The change condition determination unit 128 determines whether the policy change condition is satisfied based on the monitoring data (and other data) read at step S401 (step S402). If the change condition determination unit 128 determines that the policy change condition is satisfied, the process proceeds to step S403; and if not, the operation of FIG. 8 is terminated.

At step S403, the policy change request unit 129 generates a policy change request indicating the description of a change requested to other policy determination apparatuses 10. The policy change request unit 129 may select at step S403 the description of the policy change request and/or request destinations based on the policy change condition determined at step S402 as being satisfied.

Next, the communication I/F 110 transmits the policy change request generated at step S403 to the request destination policy determination apparatuses 10 via a network (step S404), and the operation of FIG. 8 is terminated.

Another example of the policy change request operation executed by the policy determination apparatus 10 upon other policy determination apparatuses 10 will be explained below with reference to FIG. 9. The exemplary operation of FIG. 9 differs from the exemplary operation of FIG. 8 in that a first policy change condition and second policy change condition are defined in different steps. The operation of FIG. 9 may be executed on a regular basis or irregular basis. For instance, the operation of FIG. 9 may be executed every time new monitoring data or a policy update request from a routing control apparatus 20 subordinate to the policy determination apparatus 10 or the like is stored in the memory 130.

First, the change condition determination unit 128 reads monitoring data from the monitoring data storage unit 131 (step S411). At step S411, the change condition determination unit 128 may read other data from the memory 130.

The change condition determination unit 128 determines whether the first policy change condition is satisfied, based on the monitoring data (and other data) read at step S411 (step S412). If the change condition determination unit 128 determines that the first policy change condition is satisfied, the process proceeds to step S413; and if not, the operation of FIG. 9 is terminated.

At step S413, the change condition determination unit 128 determines whether the second policy change condition is satisfied, based on the monitoring data (and other data) read at step S411. If the change condition determination unit 128 determines that the second policy change condition is satisfied, the process proceeds to step S417; and if not, the process proceeds to step S414.

At step S414, the policy change request unit 129 generates a first policy change request indicating the description of a change requested to other policy determination apparatuses 10. The policy change request unit 129 may select at step S414 the description of the change indicated by the first policy change request based on the first policy change condition determined at step S412 as being satisfied.

At step S415, the policy change request unit 129 selects a first policy determination apparatus group. A first policy determination apparatus group here represents one or more policy determination apparatuses 10, which serve as request destinations of the first policy change request generated at step S414. The policy change request unit 129 may select at step S415 a first policy determination apparatus group based on the first policy change condition determined at step S412 as being satisfied.

After steps S414 and S415, the communication I/F 110 transmits the first policy change request generated at step S414, via a network to the first policy determination apparatus group selected at step S415 (step S416), and the operation of FIG. 9 is terminated.

At step S417, the policy change request unit 129 generates a second policy change request indicating the description of a change requested to other policy determination apparatuses 10. The policy change request unit 129 may select at step S417 the description of the change indicated by the second policy change request, based on the second policy change condition determined at step S413 as being satisfied. The description of the change indicated by the second policy change request may be the same as, or different from, the description of the change indicated by the first policy change request.

At step S418, the policy change request unit 129 selects a second policy determination apparatus group. A second policy determination apparatus group here represents one or more policy determination apparatuses 10, which serve as request destinations of the second policy change request generated at step S417. The policy change request unit 129 may select at step S418 a second policy determination apparatus group based on the second policy change condition determined at step S413 as being satisfied. The second policy determination apparatus group may be the same as, or different from, the first policy determination apparatus group.

After steps S417 and S418, the communication I/F 110 transmits the second policy change request generated at step S417, via a network to the second policy determination apparatus group selected at step S418 (step S419), and the operation of FIG. 9 is terminated.

FIGS. 8 and 9 show typical operation examples. Policy change conditions having three or more steps may be defined, or when a higher policy change condition is satisfied, a large change, such as a large decrease in the weight of a target routing destination, may be requested to respective request destinations as mentioned earlier, in addition to an increase of the number of request destinations for the policy change.

An exemplary policy update operation performed by the policy determination apparatus 10 will be explained below with reference to FIG. 10. The operation of FIG. 10 may be executed on a regular basis or irregular basis. For instance, the operation of FIG. 10 may be executed every time new monitoring data, a policy change request, a policy update request from a routing control apparatus 20 subordinate to the policy determination apparatus 10, or the like is stored in the memory 130.

First, the update condition determination unit 124 determines whether or not the policy update condition is satisfied (step S501). The update condition determination unit 124 may determine whether or not a policy update condition is satisfied, for example, based on the monitoring data stored in the monitoring data storage unit 131, a policy change request stored in the change request storage unit 132, and/or a policy update request stored in the memory 130 and received from a routing control apparatus 20 subordinate to the policy determination apparatus 10. If the update condition determination unit 124 determines that the policy update condition is satisfied, the process proceeds to step S502; and if not, the operation of FIG. 10 is terminated.

At step S502, the policy update request unit 125 requests the policy determination unit 126 to update the policy. The policy update request unit 125 may select an update target policy at step S502, based on the policy update condition determined at step S501 to be satisfied.

Next, the policy determination unit 126 reads various kinds of data required for a policy update from the memory 130 (step S503). Such data may be monitoring data, setting data, and/or a policy change request. The data may also include a policy before an update.

The policy determination unit 126 determines a policy based on the data read out at step S503, and stores the determined policy in the policy storage unit 134 (step S504).

Figure 10:
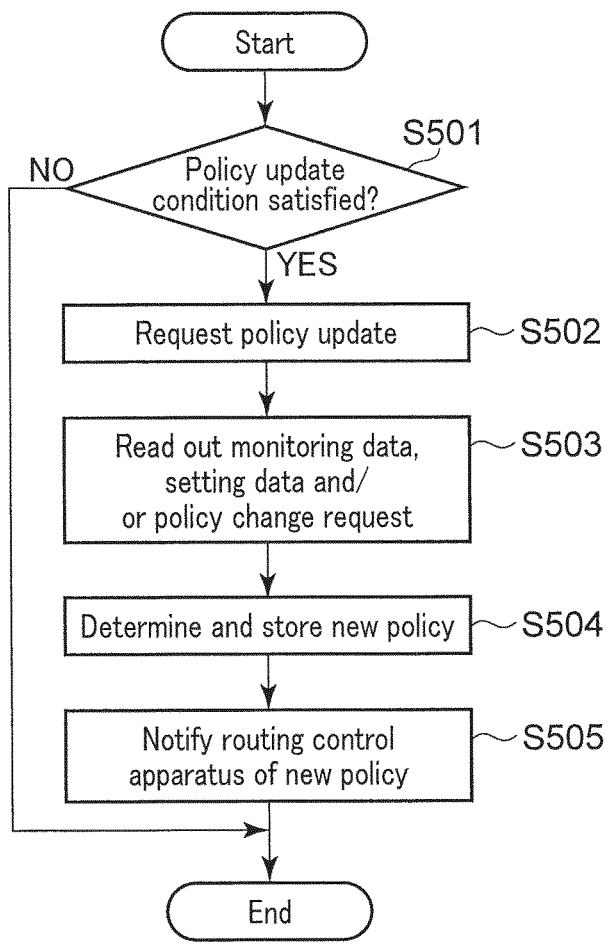
FIG. 10 is a flowchart of an exemplary policy update operation performed by the policy determination apparatus of FIG. 3.

Next, the policy notification unit 127 reads the policy stored at step S504 from the policy storage unit 134 and notifies the routing control apparatuses 20 that will use this policy (step S505), and the operation of FIG. 10 is terminated.

As described above, the policy determination apparatus according to the present embodiment determines whether or not a predetermined policy change condition is satisfied, and if it is determined that the condition is satisfied, the policy determination apparatus requests other policy determination apparatuses to change the determined policy. Based on the received policy change request, these other policy determination apparatuses correct the determined policy. That is, upon detection of a local change in the state of the network facilities, one of the policy determination apparatuses issues a policy change request, in response to which another policy determination apparatus corrects the policy determined by itself. Thus, even in a large-scale load distribution system including such a policy determination apparatus, the policy can be corrected so as to adapt to a local change in the state of the network facilities, and therefore the routing control apparatus that uses this policy can suitably route the request.

Furthermore, a policy determination apparatus can determine whether or not a predetermined policy update condition is satisfied, and when it is determined that the condition is satisfied, the policy determination apparatus can dynamically determine the policy to be used by a routing control apparatus subordinate to the policy determination apparatus, based on the monitoring data received from an external device and relating to the state of the network facilities, a policy change request received from other policy determination apparatuses, and the like.

Modification Example 1

In the above embodiment, it is assumed that the routing control apparatus 20 may correspond to an L7 load balancer. In place of the routing control apparatus 20, a routing control apparatus 30 corresponding to an L4 load balancer (also referred to as a DNS load balancer) may be adopted.

FIGS. 11 and 12 show modification examples of the load distribution system in FIG. 1. These load distribution systems differ from the load distribution system of FIG. 1 in incorporation of routing control apparatuses 30A, 30B . . . instead of routing control apparatuses 20A, 20B . . . , and addition of a DNS resolver 80 and an authoritative DNS server 90 (FIG. 12).

The policy determination apparatus 10 collects monitoring data from the probe server 41 and/or monitoring system 42 (S10). For instance, a policy update request (S11) from any of the subordinate routing control apparatuses 30A, 30B . . . triggers the policy determination apparatus 10 to determine (update) a policy that is to be used by the routing control apparatus 30 that has issued the policy update request. The policy determination apparatus 10 notifies the routing control apparatus 30 that has issued the policy update request of the determined policy (S12).

In the same manner as in the example of FIG. 1, there may be two routing control apparatuses 30 or only one apparatus subordinate to a policy determination apparatus 10, or there may be three or more routing control apparatuses 30 in total.

The routing control apparatus 30 may correspond to an L4 load balancer. A zone is defined for each routing control apparatus 30 so that the routing control apparatus 30 can route requests to the PoP that belongs to the corresponding zone.

The routing control apparatus 30 receives an inquiry about an Internet Protocol (IP) address corresponding to the domain name of the origin server 60 from the DNS resolver 80 (S32). In response to this inquiry, the routing control apparatus 30 returns the IP address of a routing destination (e.g., origin server 60, edge server 70A, 70B, 70C . . . , or CDN 100A, 100B . . . ) selected in accordance with the policy determined by the policy determination apparatus 10 (S33), or information of the authoritative DNS server that manages this IP address (S43). In other words, the routing control apparatus 30 routes the request. The request routing destinations (except for the origin server 60) may be connected to the origin server 60 as needed if the targeted content of a request is not cached or the like (S36, S48).

In order to acquire the contents held in the origin server 60, the end user 50 may issue a request containing a URL indicating the location of the content as destination data. The end user 50 transmits the issued request to the DNS resolver 80 (S31). Then, the end user 50 is notified by the DNS resolver 80 of an IP address of a request routing destination (S34, S46). The end user 50 transmits a request to the notified-of IP address (S35, S47).

The DNS resolver 80 receives an inquiry of an IP address corresponding to the domain name of the origin server 60 from the end user 50A (S31). The DNS resolver 80 sends an inquiry about the IP address corresponding to this domain name to the routing control apparatus 30 that is an authoritative DNS server holding this domain name information (S32). The DNS resolver 80 receives a response to the inquiry from the routing control apparatus 30 (S33, S43).

In the example of FIG. 11, the IP address of the routing destination is a known address for the routing control apparatus 30, and therefore the response includes the IP address of the routing destination. The DNS resolver 80 notifies the end user 50A of the IP address of this routing destination (S34).

On the other hand, in the example of FIG. 12, the IP address of a cache server in the routing destination CDN #2 is unknown for the routing control apparatus 30, and therefore the DNS resolver 80 is guided to the authoritative DNS server 90 of the CDN #2. The DNS resolver 80 sends an inquiry about the IP address corresponding to the domain name of the origin server 60 to the authoritative DNS server 90 (S44). In response to this inquiry, the DNS resolver 80 receives, for example, the IP address of the cache server in the CDN #2 (S45). Then, the DNS resolver 80 notifies the end user 50A of this IP address (S46).

The authoritative DNS server 90 of the CDN #2 manages the domain names of facilities such as cache servers included in the CDN #2, and their corresponding IP addresses. The authoritative DNS server 90 receives an inquiry about an IP address corresponding to the domain name of the origin server 60 (S44). In response to this inquiry, the authoritative DNS server 90 returns an IP address of facilities such as a cache server in the CDN #2 (S45).

Modification Example 2

According to the above embodiment, the policy determination apparatus is explained as determining a policy to be used by its subordinate routing control apparatus for controlling the routing destinations of requests including destination data of a given origin server. The policy determined by the policy determination apparatus, however, is not limited to its subordinate routing control apparatus, but may be shared by routing control apparatuses subordinate to other policy determination apparatuses. Thus, even if routing control apparatuses that handle the request from an end user are changed in accordance with a movement of this end user, the same policy can be applied to the request from the end user. Thus, even if a routing control apparatus that handles a request from an end user is switched to another apparatus due to this end user having moved, the same policy can be applied to the request from the end user.

For example, (the policy determination unit 126 of) the policy determination apparatus may determine a general policy to be fundamentally applied by its subordinate routing control apparatus to any request that includes destination data of a given origin server, and a specific policy to be applied to some of the requests that satisfy a given condition. The (policy notification unit 127 of the) policy determination apparatus may notify the subordinate routing control apparatuses of the latter policy, and notify via other policy determination apparatuses the routing control apparatuses subordinate to these policy determination apparatuses. This policy does not need to be simultaneously shared by all of the routing control apparatuses, and therefore the policy determined for given routing control apparatuses may be reported, on a higher priority, to the routing control apparatus and routing control apparatuses corresponding to its geographically adjacent zones.

A given condition may be defined by parameters such as a device type, a content type, or by a combination of these parameters. The device type may represent, when the end user 50 is a vehicle or a vehicle-mounted device, a vehicle type, model, and the like. The content type may represent types of contents (e.g., image data, video data, and position data) targeted by a request for acquisition or posting.

The above embodiment is illustrated simply as a concrete example to assist the understanding of the concept of the present invention and is not intended to limit the scope of the invention. Addition, deletion, or replacement of structural components may be made without departing from the scope of the invention.

Several functional units are explained in the above embodiment, and are merely an example of implementation of the functional units. The functional units explained as being arranged in one apparatus may be arranged in multiple and separate apparatuses, or functional units explained as being arranged in multiple and separate apparatuses may be arranged in a single apparatus.

The functional units explained in the embodiments may be realized by using a circuit. This circuit may be a special-purpose circuit that realizes specific functions or a general-purpose circuit such as a processor.

At least part of the processing of the embodiments may also be realized through use of a CPU and/or a GPU installed in a general-purpose computer, or a processor such as a microcomputer, FPGA, or DSP, as basic hardware. The program for realizing the above processing may be stored and provided in a computer-readable storage medium. The program is stored in a storage medium in the form of a file of an installable format or executable format. Examples of storage media include a magnetic disk, an optical disk (e.g., CD-ROM, CD-R, DVD), a magneto-optical disk (e.g., MO), and a semiconductor memory. Any storage medium can be adopted as long as it is a computer-readable medium that can store programs. In addition, the program that realizes the above process may be stored in a computer (server) connected to a network such as the Internet so that the program can be downloaded to a computer (client) via the network.

REFERENCE SIGNS LIST 10, 10-1, 10-2, 10-3 Policy determination apparatus
20, 20A, 20B, 20-1A, 20-2A, 20-3A, 30, 30A, 30B Routing control apparatus
41 Probe server
42 Monitoring system
50, 50A, 50B End user
60 Origin server
70, 70A, 70B, 70C Edge server
80 DNS resolver
90 Authoritative DNS server
100, 100A, 100B CDN
110 Communication I/F
120 Processor
121 Reception data acquisition unit
122 Monitoring data acquisition unit
123 Change request acquisition unit
124 Update condition determination unit
125 Policy update request unit
126 Policy determination unit
127 Policy notification unit
128 Change condition determination unit
129 Policy change request unit
130 Memory
131 Monitoring data storage unit
132 Change request storage unit
133 Setting data storage unit
134 Policy storage unit

The invention claimed is:

1. A policy determination apparatus comprising:
a monitoring data acquisition unit configured to acquire monitoring data relating to states of facilities on a network, the monitoring data being received from an external device;
a policy determination unit configured to determine, based on the monitoring data, a first policy that a first routing control apparatus uses for controlling a routing destination of a first request including first destination data;
a policy notification unit configured to notify the first routing control apparatus of the first policy;
a change condition determination unit configured to determine, based on the monitoring data, whether or not a predetermined first policy change condition is satisfied; and
a change request unit configured to, when it is determined that the first policy change condition is satisfied, request a first policy determination apparatus to change a second policy, the first policy determination apparatus determining the second policy that a second routing control apparatus different from the first routing control apparatus uses for controlling a routing destination of a second request including the first destination data, the first policy and the second policy representing a policy indicating a plurality of request routing destination candidates and proportions of the request routing destination candidates to which requests are routed.

2. The policy determination apparatus according to claim 1, further comprising:
an update condition determination unit configured to determine whether or not a predetermined policy update condition is satisfied; and
an update request unit configured to request an update of the first policy when it is determined that the policy update condition is satisfied.

3. The policy determination apparatus according to claim 1, wherein
the monitoring data indicates a load of at least a portion of a plurality of first candidates for a routing destination of a request including the first destination data, and
the first policy change condition is that a load of a first routing destination included in the first candidates exceeds a first load threshold.

4. The policy determination apparatus according to claim 1, wherein
the monitoring data indicates a number of clients of at least a portion of a plurality of first candidates for a routing destination of a request including the first destination data, and
the first policy change condition is that the number of clients of a first routing destination included in the first candidates exceeds a first client number threshold.

5. The policy determination apparatus according to claim 1, wherein
the monitoring data indicates availability of at least a portion of a plurality of first candidates for a routing destination of a request including the first destination data, and
the first policy change condition is that a first routing destination included in the first candidates is not in an available state.

6. The policy determination apparatus according to claim 2, wherein
the monitoring data indicates a load of at least a portion of a plurality of first candidates for a routing destination of a request including the first destination data, and
the first policy change condition is that a load of a first routing destination included in the first candidates exceeds a first load threshold.

7. The policy determination apparatus according to claim 2, wherein
the monitoring data indicates a number of clients of at least a portion of a plurality of first candidates for a routing destination of a request including the first destination data, and
the first policy change condition is that the number of clients of a first routing destination included in the first candidates exceeds a first client number threshold.

8. The policy determination apparatus according to claim 2, wherein
the monitoring data indicates availability of at least a portion of a plurality of first candidates for a routing destination of a request including the first destination data, and
the first policy change condition is that a first routing destination included in the first candidates is not in an available state.

9. The policy determination apparatus according to claim 6, wherein
the second policy indicates proportions of a plurality of second candidates for a routing destination of the second request, to which the second routing control apparatus routes the second request,
when it is determined that the first policy change condition is satisfied, the change request unit requests the first policy determination apparatus to lower a proportion of the first routing destination to which the second routing control apparatus routes the second request.

10. The policy determination apparatus according to claim 7, wherein
the second policy indicates proportions of a plurality of second candidates for a routing destination of the second request, to which the second routing control apparatus routes the second request,
when it is determined that the first policy change condition is satisfied, the change request unit requests the first policy determination apparatus to lower a proportion of the first routing destination to which the second routing control apparatus routes the second request.

11. The policy determination apparatus according to claim 6, wherein
the change condition determination unit further determines, based on the monitoring data, whether or not a predetermined second policy change condition is satisfied,
the second policy change condition is that the load of the first routing destination exceeds a second load threshold larger than the first load threshold, and
when it is determined that the second policy change condition is satisfied, the change request unit requests the first policy determination apparatus to change the second policy, and requests a second policy determination apparatus to change a third policy, the second policy determination apparatus determining the third policy to be used by a third routing control apparatus, which is different from the first routing control apparatus and the second routing control apparatus, for controlling a routing destination of a third request including the first destination data.

12. The policy determination apparatus according to claim 7, wherein
the change condition determination unit further determines, based on the monitoring data, whether or not a predetermined second policy change condition is satisfied,
the second policy change condition is that the number of clients of the first routing destination exceeds a second client number threshold larger than the first client number threshold, and
when it is determined that the second policy change condition is satisfied, the change request unit requests the first policy determination apparatus to change the second policy, and requests a second policy determination apparatus to change a third policy, the second policy determination apparatus determining the third policy to be used by a third routing control apparatus, which is different from the first routing control apparatus and the second routing control apparatus, for controlling a routing destination of a third request including the first destination data.

13. The policy determination apparatus according to claim 11, wherein
the second policy indicates proportions of a plurality of second candidates for a routing destination of the second request, to which the second routing control apparatus routes the second request,
the third policy indicates proportions of a plurality of third candidates for a routing destination of the third request, to which the third routing control apparatus routes the third request, and
when it is determined that the second policy change condition is satisfied, the change request unit requests the first policy determination apparatus to lower the proportion of the first routing destination to which the second routing control apparatus routes the second request, and requests the second policy determination apparatus to lower the proportion of the first routing destination to which the third routing control apparatus routes the third request.

14. The policy determination apparatus according to claim 12, wherein
the second policy indicates proportions of a plurality of second candidates for a routing destination of the second request, to which the second routing control apparatus routes the second request,
the third policy indicates proportions of a plurality of third candidates for a routing destination of the third request, to which the third routing control apparatus routes the third request, and
when it is determined that the second policy change condition is satisfied, the change request unit requests the first policy determination apparatus to lower the proportion of the first routing destination to which the second routing control apparatus routes the second request, and requests the second policy determination apparatus to lower the proportion of the first routing destination to which the third routing control apparatus routes the third request.

15. The policy determination apparatus according to claim 1, wherein
the policy determination unit further determines, based on the monitoring data, a fourth policy to be used by the first routing control apparatus for controlling a routing destination of requests including the first request that satisfy a first condition, and
the policy notification unit further notifies the first routing control apparatus and the first policy determination apparatus of the fourth policy.

16. A policy determining method comprising:
acquiring monitoring data relating to states of facilities on a network, the monitoring data being received from an external device;
determining, based on the monitoring data, a first policy that a first routing control apparatus uses for controlling a routing destination of a first request including first destination data;
notifying the first routing control apparatus of the first policy;
determining, based on the monitoring data, whether or not a predetermined first policy change condition is satisfied; and requesting, when it is determined that the first policy change condition is satisfied, a first policy determination apparatus to change a second policy, the first policy determination apparatus determining the second policy that a second routing control apparatus different from the first routing control apparatus uses for controlling a routing destination of a second request including the first destination data, the first policy and the second policy representing a policy indicating a plurality of request routing destination candidates and proportions of the request routing destination candidates to which requests are routed.

17. A non-transitory computer readable medium storing a computer program which is executed by a computer to provide the steps of:

acquiring monitoring data received from an external device, the data relating to a state of facilities in a network;

determining, based on the monitoring data, a first policy that a first routing control apparatus uses for controlling a routing destination of a first request including first destination data;

notifying the first routing control apparatus of the first policy;

determining, based on the monitoring data, whether or not a predetermined first policy change condition is satisfied; and requesting, when it is determined that the first policy change condition is satisfied, a first policy determination apparatus to change a second policy, the first policy determination apparatus determining the second policy that a second routing control apparatus different from the first routing control apparatus uses for controlling a routing destination of a second request including the first destination data, the first policy and the second policy representing a policy indicating a plurality of request routing destination candidates and proportions of the request routing destination candidates to which requests are routed.

* * * * *